US012692342B2

(12) United States Patent
Ota

(10) Patent No.: US 12,692,342 B2
(45) Date of Patent: Jul. 28, 2026

(54) EPOXY RESIN COMPOSITION, CURED PRODUCT, AND ELECTRICAL/ELECTRONIC COMPONENT

(71) Applicant: Mitsubishi Chemical Corporation, Tokyo (JP)

(72) Inventor: Kazumasa Ota, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 610 days.

(21) Appl. No.: 17/822,281

(22) Filed: Aug. 25, 2022

(65) Prior Publication Data

US 2023/0002543 A1 Jan. 5, 2023

Related U.S. Application Data

(63) Continuation of application No. PCT/JP2021/009269, filed on Mar. 9, 2021.

(30) Foreign Application Priority Data

Mar. 16, 2020 (JP) ................................ 2020-045532
Mar. 16, 2020 (JP) ................................ 2020-045533

(51) Int. Cl.
*C08G 59/62* (2006.01)

(52) U.S. Cl.
CPC .................................. *C08G 59/621* (2013.01)

(58) Field of Classification Search
None
See application file for complete search history.

(56) References Cited

U.S. PATENT DOCUMENTS

| | | | | |
|---|---|---|---|---|
| 11,299,620 | B2 | 4/2022 | Oota | |
| 2009/0054587 | A1 | 2/2009 | Oshimi et al. | |
| 2015/0018515 | A1 | 1/2015 | Hosokawa et al. | |
| 2017/0204077 | A1 | 7/2017 | Hosokawa et al. | |
| 2017/0271226 | A1 | 9/2017 | Oota | |
| 2018/0215862 | A1 | 8/2018 | Oota | |
| 2019/0202974 | A1* | 7/2019 | Hirota | C08L 63/00 |
| 2020/0299503 | A1 | 9/2020 | Oota | |

FOREIGN PATENT DOCUMENTS

| | | | |
|---|---|---|---|
| CN | 101142253 | A | 3/2008 |
| CN | 107001580 | A | 8/2017 |
| CN | 107922588 | A | 4/2018 |
| JP | 58-39677 | A | 3/1983 |
| KR | 10-2018-0048673 | | 5/2018 |
| TW | 201718757 | A | 6/2017 |
| WO | WO 2013/147092 | A1 | 10/2013 |
| WO | WO 2015/029436 | A1 | 3/2015 |
| WO | WO 2019/117077 | A1 | 6/2019 |

OTHER PUBLICATIONS

Combined Taiwanese Office Action and Search Report issued Jun. 14, 2024 in Taiwanese Application No. 110108869 with English Machine translation, 18 pgs.
Combined Chinese Office Action and Search Report issued May 19, 2023 in Chinese Application No. 202180019186.3, (with English Machine translation), 16 pages.
International Search Report issued May 18, 2021 in PCT/JP2021/009269, filed on Mar. 9, 2021, 2 pages.
Office Action dated Jan. 12, 2026, in corresponding KR Application No. 10-2022-7025575 (with machine translation).

* cited by examiner

*Primary Examiner* — Megan McCulley
(74) *Attorney, Agent, or Firm* — Oblon, McClelland, Maier & Neustadt, L.L.P.

(57) ABSTRACT

An epoxy resin composition (A), having an epoxy resin represented by formula (1):

(1)

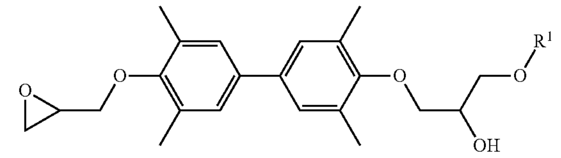

and an epoxy resin represented by formula (2):

(2)

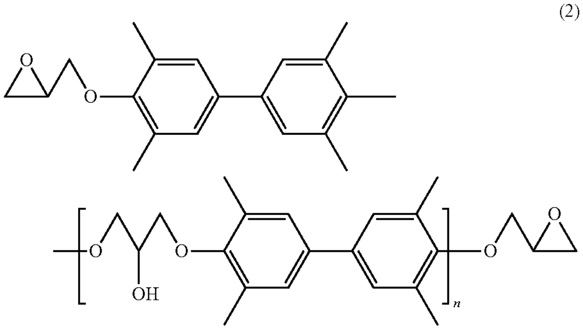

where $R^1$ is a linear aliphatic hydrocarbon group having 1 to 6 carbon atoms, and n is an integer of 0 or 1. An epoxy resin composition (B), having 100 parts by weight of the epoxy resin composition (A) and 0.01 to 1,000 parts by weight of a curing agent.

8 Claims, No Drawings

EPOXY RESIN COMPOSITION, CURED PRODUCT, AND ELECTRICAL/ELECTRONIC COMPONENT

CROSS REFERENCE TO RELATED APPLICATIONS

This application is a continuation application of PCT/JP2021/009269, filed on Mar. 9, 2021, and claims priority to Japanese Patent Application No. 2020-045532, filed on Mar. 16, 2020, and Japanese Patent Application No. 2020-045533, filed on Mar. 16, 2020, the entire contents of which are incorporated herein by reference.

TECHNICAL FIELD

The present invention relates to an epoxy resin composition having a low hydrolyzable chlorine content and superior electrical properties. Moreover, an epoxy resin composition according to an embodiment of the present invention has a high curing rate and superior productivity. Furthermore, an epoxy resin composition according to another embodiment of the present invention can provide a cured product having low elasticity at high temperatures and superior crack resistance.

The present invention also relates to a cured product obtained by curing this epoxy resin composition. The present invention also relates to an electrical or electronic component composed of the cured product of the epoxy resin.

BACKGROUND ART

Epoxy resins have been used in a wide range of fields, such as adhesives, paints, and electrical and electronic materials, because they are cured with various curing agents into cured products that typically have, for example, superior mechanical properties, heat resistance, and electrical properties. Especially in the field of electrical and electronic materials, tetramethylbiphenol-type epoxy resins are widely used for semiconductor-encapsulating material applications because they can provide high value-added encapsulating materials.

As recent trends in a technique for producing a semiconductor-encapsulating material, the following (1) and (2) are required.

(1) Cost Reduction by Simplifying Process for Producing Semiconductor-Encapsulating Material It is required not only to improve the quality of an epoxy resin as a raw material and the productivity of the production process thereof, but also to improve the quality of a cured product itself and simplify the curing process when a cured product, such as a semiconductor-encapsulating material, is obtained by mixing an epoxy resin and a curing agent.

(2) Use of Semiconductor in High-Temperature Environment

Thus, regarding an epoxy resin used as a raw material of a semiconductor-encapsulating material, a cured product obtained by mixing the epoxy resin with a curing agent and curing the mixture is required to have superior heat resistance and durability, assuming use in a high-temperature environment.

Patent Literature 1 states that a tetramethylbiphenol-type epoxy resin was produced by the reaction of 4,4'-bishydroxy-3,3',5,5'-tetramethylbiphenyl with epichlorohydrin.

PTL 1: JP58-039677A

When the tetramethylbiphenol-type epoxy resin described in Patent Literature 1 is cured together with a curing agent and used as a semiconductor-encapsulating material, the copper lines of a semiconductor device tend to corrode easily. It was found that the reason for this was the epoxy resin having a high hydrolyzable chlorine content, which was a cause of corrosion.

In a process for producing a semiconductor-encapsulating material, the process including producing an epoxy resin on an industrial scale and forming the epoxy resin into a cured product, the epoxy resin described in Patent Literature 1 does not have a sufficiently satisfactory curing rate for the cured product, which is an important factor in productivity.

When a cured product obtained by using the epoxy resin described in Patent Literature 1 is used as a semiconductor-encapsulating material at high temperatures, the encapsulating material may be cracked, and thus does not have satisfactory crack resistance at high temperatures.

SUMMARY OF INVENTION

The present invention aims to provide an epoxy resin composition (A) having a low hydrolyzable chlorine content, superior electrical properties, and a high curing rate when a cured product is obtained using a curing agent, and being capable of providing a cured product in an industrially advantageous process.

The present invention also aims to provide an epoxy resin composition (A) having a low hydrolyzable chlorine content and superior electrical properties, and being capable of providing a cured product having superior high-temperature crack resistance.

The present invention also aims to provide an epoxy resin composition (B) containing such an epoxy resin composition (A) and a curing agent, and a cured product thereof.

The present invention also aims to provide an electrical or electronic component including the epoxy resin cured product.

The inventor has found that the above problems can be solved by the use of an epoxy resin composition (A) containing an epoxy resin having a specific structure in a specific proportion and an epoxy resin composition (B) containing the epoxy resin composition (A) and a curing agent. These findings have led to the completion of the present invention.

The gist of the present invention lies in the following [1] to [9].

[1] An epoxy resin composition (A), comprising an epoxy resin represented by formula (1) and an epoxy resin represented by formula (2),

[Chem. 1]

(1)

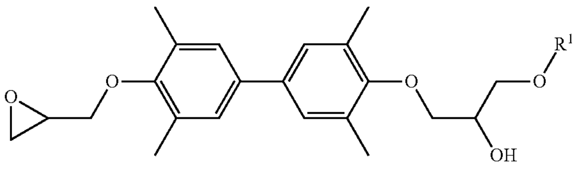

(where in formula (1), $R^1$ is a linear aliphatic hydrocarbon group having 1 to 6 carbon atoms), and

[Chem. 2]

(2)

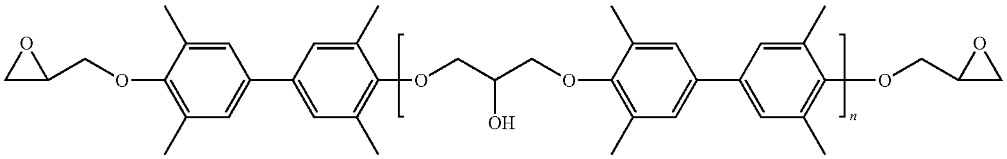

(where in formula (2), n is an integer of 0 or 1).

[2] The epoxy resin composition (A) according to [1], wherein a proportion of the epoxy resin represented by formula (1) present in the epoxy resin composition is 0.01% to 5.0% by weight.

[3] The epoxy resin composition (A) according to [1] or [2], wherein in the epoxy resin represented by formula (2), a proportion of the epoxy resin in which n=0 present in the epoxy resin composition (A) is 83.0% to 90.0% by weight, and a proportion of the epoxy resin in which n=1 present in the epoxy resin composition (A) is 2.0% to 9.9% by weight.

[4] The epoxy resin composition (A) according to any one of [1] to [3], wherein the epoxy resin composition has a hydrolyzable chlorine content of 300 ppm or less by weight.

[5] An epoxy resin composition (B), comprising 100 parts by weight of the epoxy resin composition (A) according to any one of [1] to [4] and 0.01 to 1,000 parts by weight of a curing agent.

[6] The epoxy resin composition (B) according to [5], wherein the curing agent is at least one selected from the group consisting of phenolic curing agents, amine curing agents, acid anhydride curing agents, and amide curing agents.

[7] The epoxy resin composition (B) according to [5] or [6], further comprising an epoxy resin different from the epoxy resin in the epoxy resin composition (A).

[8] A cured product obtained by curing the epoxy resin composition (B) according to any one of [5] to [7].

[9] An electrical or electronic component obtained by curing the epoxy resin composition (B) according to any one of [5] to [7].

Advantageous Effects of Invention

According to the present invention, there are provided an epoxy resin composition (A) having a low hydrolyzable chlorine content compared with conventional products, superior electrical properties, a high curing rate when a cured product is obtained using a curing agent, and being capable of providing a cured product in an industrially advantageous process, an epoxy resin composition (B) containing the epoxy resin composition (A) and a curing agent, and a cured product thereof.

According to the present invention, there are also provided an epoxy resin composition (A) having a low hydrolyzable chlorine content compared with conventional products, superior electrical properties, and being capable of providing a cured product having low elasticity at high temperatures and superior crack resistance, an epoxy resin composition (B) containing the epoxy resin composition (A) and a curing agent, and a cured product thereof.

The epoxy resin cured products of the present invention have the above-described advantageous effects and thus each can be used particularly effectively for an electrical or electronic component, such as a semiconductor-encapsulating material or a laminate.

DESCRIPTION OF EMBODIMENTS

Embodiments of the present invention will be described in detail below. The following description is an example of an embodiment of the present invention. The present invention is not limited to the following description as long as it does not exceed the gist thereof.

When the expression "to" is used in the present specification, it shall be used as an expression including numerical values or physical property values before and after the expression.

[Epoxy Resin Composition (A)]

An epoxy resin composition (A) of the present invention contains an epoxy resin represented by formula (1) (hereinafter, also referred to as an "epoxy resin (1)") and an epoxy resin represented by formula (2) (hereinafter, also referred to as an "epoxy resin (2)".

[Chem. 3]

(1)

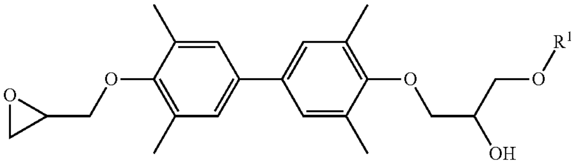

(where in formula (1), $R^1$ is a linear aliphatic hydrocarbon group having 1 to 6 carbon atoms), and

[Chem. 4]

(2)

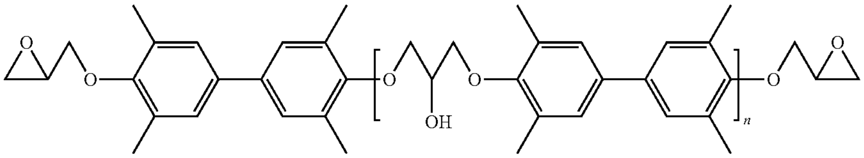

(where in formula (2), n is an integer of 0 or 1).

In the epoxy resin composition (A) of the present invention, the proportion of the epoxy resin (1) present in the epoxy resin composition (A) is preferably 0.01% to 5.0% by weight. In the epoxy resin (2) in the epoxy resin composition (A) of the present invention, preferably, the epoxy resin in which n=0 in formula (2) (hereinafter, also referred to as an "epoxy resin (2-0)") is present in an amount of 83.0% to 90.0% by weight based on 100% by weight of the epoxy resin composition (A), and the epoxy resin in which n=1 in formula (2) (hereinafter, also referred to as an "epoxy resin (2-1)") is present in an amount of 2.0% to 9.9% by weight based on 100% by weight of the epoxy resin composition (A).

In the case of the epoxy resin (1) in which $R^1$ in formula (1) is a linear aliphatic hydrocarbon group having 1 to 3 carbon atoms, more preferably, the proportion of the epoxy resin (2-0) present in 100% by weight of the epoxy resin composition (A) is 83.8% to 88.2% by weight, and the proportion of the epoxy resin (2-1) present in 100% by weight of the epoxy resin composition (A) is 4.8% to 9.2% by weight.

In the case of the epoxy resin (1) in which $R^1$ in formula (1) is a linear aliphatic hydrocarbon group having 4 to 6 carbon atoms, even more preferably, the proportion of the epoxy resin (2-0) present in 100% by weight of the epoxy resin composition (A) is 83.9% to 88.3% by weight, and the proportion of the epoxy resin (2-1) present in 100% by weight of the epoxy resin composition (A) is 4.7% to 9.3% by weight.

The epoxy resin composition (A) of the present invention may further contain components other than the epoxy resin (1), the epoxy resin (2-0), or the epoxy resin (2-1) (hereinafter, simply referred to as "other components"). The amount of other components contained in the epoxy resin composition (A) is preferably 8.0% or less by weight. When the epoxy resin composition (A) of the present invention contains other components, the total amount of epoxy resin (1), epoxy resin (2) and other components is 100% by weight.

The epoxy resin composition (A) of the present invention is defined as an "epoxy resin composition" because it contains multiple components, such as the epoxy resin (1) and the epoxy resin (2). However, in the technical field of epoxy resins, an "epoxy resin" is not a single component but is obtained as a "composition" composed of multiple components. For this reason, the epoxy resin composition (A) of the present invention is expressed as an "epoxy resin" in the industry, and may be sold as an "epoxy resin". In addition, an "epoxy compound (uncured)" is also referred to as an "epoxy resin" in the art. Thus, the compound represented by formula (1) and the compound represented by formula (2) are also referred to as "epoxy resins".

[Mechanism]

The epoxy resin composition (A) of the present invention that contains the epoxy resin (2) containing two glycidyl ether groups and the epoxy resin (1) containing one glycidyl ether group has a low hydrolyzable chlorine content due to the structure of the epoxy resin (1) and has superior electrical properties.

When the epoxy resin (1) is represented by formula (1) where $R^1$ is a linear aliphatic hydrocarbon group having 1 to 3 carbon atoms, the epoxy resin composition (B) containing a curing agent has a high curing rate and provides a cured product with superior productivity.

In addition, when the epoxy resin (1) is represented by formula (1) where $R^1$ is a linear aliphatic hydrocarbon group having 4 to 6 carbon atoms, the epoxy resin composition (B) containing a curing agent provides a cured product having low elasticity at high temperatures and superior crack resistance.

[Epoxy Resin (1), Epoxy Resin (2), and Other Components]

The epoxy resin composition (A) of the present invention preferably contains the epoxy resin (1) in an amount of 0.01% or more by weight and 5.0% or less by weight.

When $R^1$ in formula (1) that represents the epoxy resin (1) of the present invention is a linear aliphatic hydrocarbon group having 1 to 3 carbon atoms, the epoxy resin composition (A) of the present invention more preferably contains the epoxy resin (1) in an amount of 0.10% or more by weight and 4.5% or less by weight, even more preferably 0.20% or more by weight and 4.0% or less by weight, from the viewpoint of achieving a low hydrolyzable chlorine content, superior electrical properties, and a high curing rate in the form of the curing agent-containing epoxy resin composition (B), described later, from which a cured product is obtained with superior productivity. A higher epoxy resin (1) content tends to result in a higher hydrolyzable chlorine content of the epoxy resin composition (A), and in addition, tends to result in deteriorations in the electrical properties and productivity of the epoxy resin composition (B) containing the epoxy resin composition (A) and a curing agent and a cured product thereof. A lower epoxy resin (1) content tends to result in a lower hydrolyzable chlorine content of the epoxy resin composition (A), and in addition, tends to result in improvements in the electrical properties and productivity of the epoxy resin composition (B) containing the epoxy resin composition (A) and a curing agent and a cured product thereof.

When $R^1$ in formula (1) that represents the epoxy resin (1) of the present invention is a linear aliphatic hydrocarbon group having 4 to 6 carbon atoms, the epoxy resin composition (A) of the present invention more preferably contains the epoxy resin (1) in an amount of 0.10% or more by weight and 4.0% or less by weight, even more preferably 0.20% or more by weight and 3.0% or less by weight, from the viewpoint of reducing the hydrolyzable chlorine content of the epoxy resin composition (A). The epoxy resin composition (A) of the present invention more preferably contains the epoxy resin (1) in an amount of 0.50% or more by weight and 4.5% or less by weight, even more preferably 2.0% or more by weight and 4.0% or less by weight, from the viewpoint of providing the curing agent-containing epoxy resin composition (B), described later, from which a cured product having superior crack resistance at high temperatures is obtained. A higher epoxy resin (1) content tends to result in a higher hydrolyzable chlorine content of the epoxy resin composition (A) and tends to result in an improvement in the high-temperature crack resistance of a cured product obtained from the epoxy resin composition (B) containing the epoxy resin composition (A) and a curing agent. A lower epoxy resin (1) content tends to result in a lower hydrolyzable chlorine content of the epoxy resin composition (A), and in addition, tends to result in a higher high-temperature elastic modulus of a cured product obtained from the epoxy resin composition (B) containing the epoxy resin composition (A) and a curing agent. Controlling the epoxy resin (1) content makes it possible to provide the epoxy resin composition (A) having a low hydrolyzable chlorine content and superior electrical properties and to provide a cured product having superior high-temperature crack resistance obtained from the epoxy resin composition (B), described later, containing the epoxy resin composition (A) and a curing agent.

In the present invention, $R^1$ in formula (1) that represents the epoxy resin (1) is a linear aliphatic hydrocarbon group having 1 to 6 carbon atoms, preferably a linear aliphatic hydrocarbon group having 1 to 3 carbon atoms or a linear aliphatic hydrocarbon group having 4 to 6 carbon atoms.

In the case of the linear aliphatic hydrocarbon group having 1 to 3 carbon atoms, an alkyl group having 1 to 3 carbon atoms is more preferred. Specifically, a methyl group, an ethyl group, and a propyl group (n-propyl group) are more preferred.

In the case of the linear aliphatic hydrocarbon group having 4 to 6 carbon atoms, an alkyl group having 4 to 6 carbon atoms is more preferred. Specifically, an n-butyl group, an n-pentyl group, and an n-hexyl group are more preferred.

When $R^1$ in formula (1) that represents the epoxy resin (1) of the present invention is a linear aliphatic hydrocarbon group having 1 to 3 carbon atoms, the epoxy resin composition (A) of the present invention preferably contains 83.0% or more by weight and 90.0% or less by weight of the epoxy resin (2-0) and 2.0% or more by weight and 9.9% or less by weight of the epoxy resin (2-1).

Regarding the epoxy resin (2), more preferably, the epoxy resin (2-0) content is 83.8% or more by weight and 88.2% or less by weight, and the epoxy resin (2-1) content is 4.8% or more by weight and 9.2% or less by weight.

When $R^1$ in formula (1) that represents the epoxy resin (1) of the present invention is a linear aliphatic hydrocarbon group having 1 to 3 carbon atoms, the epoxy resin (2) content (the total of the epoxy resin (2-0) content and the epoxy resin (2-1) content) of the epoxy resin composition (A) of the present invention is preferably 85.0% or more by weight and 99.9% or less by weight, preferably 88.6% or more by weight and 97.4% or less by weight.

When the epoxy resin (2-0) content, the epoxy resin (2-1) content, and the epoxy resin (2) content, which is the total thereof, are within the above ranges, the epoxy resin composition (B) containing a curing agent has a high curing rate and provides a cured product with superior productivity.

When $R^1$ in formula (1) that represents the epoxy resin (1) of the present invention is a linear aliphatic hydrocarbon group having 4 to 6 carbon atoms, the epoxy resin composition (A) of the present invention preferably contains 83.0% or more by weight and 90.0% or less by weight of the epoxy resin (2-0) and 4.0% or more by weight and 9.9% or less by weight of the epoxy resin (2-1).

Regarding the epoxy resin (2), more preferably, the epoxy resin (2-0) content is 83.9% or more by weight and 88.3% or less by weight, and the epoxy resin (2-1) content is 4.7% or more by weight and 9.3% or less by weight.

When $R^1$ in formula (1) that represents the epoxy resin (1) of the present invention is a linear aliphatic hydrocarbon group having 4 to 6 carbon atoms, the epoxy resin (2) content (the total of the epoxy resin (2-0) content and the epoxy resin (2-1) content) of the epoxy resin composition (A) of the present invention is preferably 87.0% or more by weight and 99.9% or less by weight, preferably 88.6% or more by weight and 97.6% or less by weight.

When the epoxy resin (2-0) content, the epoxy resin (2-1) content, and the epoxy resin (2) content, which is the total thereof, are within the above ranges, the epoxy resin composition (B) containing a curing agent provides a cured product having low elasticity at high temperatures and superior crack resistance.

The term "other components" indicates components other than the epoxy resin (1) or epoxy resin (2). Specific examples thereof include an epoxy resin in which n is 2 or more in formula (2) produced in the process of producing the epoxy resin composition (A) of the present invention, a component difficult to identify (unanalyzable component) produced as a by-product in the reaction process, and a chlorine-containing organic component.

When $R^1$ in formula (1) that represents the epoxy resin (1) in the present invention is a linear aliphatic hydrocarbon group having 1 to 3 carbon atoms, the amount of other components contained in the epoxy resin composition (A) of the present invention is preferably 8% or less by weight, more preferably 6.8% or less by weight. A larger amount of other components contained results in a higher hydrolyzable chlorine content of the epoxy resin composition (A) to lead to inferior electrical properties, and results in a low curing rate of the curing agent-containing epoxy resin composition (B) to lead to a problem with productivity.

When $R^1$ in formula (1) that represents the epoxy resin (1) in the present invention is a linear aliphatic hydrocarbon group having 4 to 6 carbon atoms, the amount of other components contained in the epoxy resin composition (A) of the present invention is preferably 8% or less by weight, more preferably 7.1% or less by weight. A larger amount of other components contained results in a higher hydrolyzable chlorine content of the epoxy resin composition (A) to lead to inferior electrical properties, and may fail to allow the curing agent-containing epoxy resin composition (B) to provide a cured product having superior high-temperature crack resistance.

When the epoxy resin composition (A) of the present invention contains other components, as described above, the total of the epoxy resin (1), epoxy resin (2) and other components is 100% by weight.

Each component content of the epoxy resin composition (A) of the present invention can be measured by, for example, high-performance liquid chromatography analysis (hereinafter, referred to as "LC analysis").

[Epoxy Equivalent]

When $R^1$ in formula (1) that represents the epoxy resin (1) in the present invention is a linear aliphatic hydrocarbon group having 1 to 3 carbon atoms, the epoxy resin composition (A) preferably has an epoxy equivalent of 180 to 193 g/equivalent, from the viewpoint of achieving superior electrical properties as the epoxy resin and superior productivity as the curing agent-containing epoxy resin composition (B). From the viewpoint of further improving the productivity during the production of the epoxy resin composition (A), when the amount of epichlorohydrin used is reduced, the epoxy resin composition (A) of the present invention more preferably has an epoxy equivalent of 184 to 192 g/equivalent. The epoxy equivalent in the above specific range seemingly results in the superior properties described above.

When $R^1$ in formula (1) that represents the epoxy resin (1) in the present invention is a linear aliphatic hydrocarbon group having 4 to 6 carbon atoms, the epoxy resin composition (A) preferably has an epoxy equivalent of 180 to 193 g/equivalent, from the viewpoint of achieving superior electrical properties as the epoxy resin and providing a cured product having superior high-temperature crack resistance as the curing agent-containing epoxy resin composition (B). From the viewpoint of further improving the productivity during the production of the epoxy resin composition (A), when the amount of epichlorohydrin used is reduced, the epoxy resin composition (A) of the present invention more preferably has an epoxy equivalent of 183 to 193 g/equivalent. The epoxy equivalent in the above specific range seemingly results in the superior properties described above.

The "epoxy equivalent" used in the present invention is defined as "the mass of an epoxy resin containing one equivalent of epoxy groups" and can be measured in accordance with JIS K7236.

[Hydrolyzable Chlorine Content]

When $R^1$ in formula (1) that represents the epoxy resin (1) in the present invention is a linear aliphatic hydrocarbon group having 1 to 3 carbon atoms, the amount of hydrolyzable chlorine contained in the epoxy resin composition (A) of the present invention (hereinafter, also referred to as a "hydrolyzable chlorine content") is preferably 300 ppm or less by weight. From the viewpoint of improving the electrical properties, the hydrolyzable chlorine content of the epoxy resin composition (A) is more preferably 250 ppm or less by weight.

When $R^1$ in formula (1) that represents the epoxy resin (1) in the present invention is a linear aliphatic hydrocarbon group having 4 to 6 carbon atoms, the epoxy resin composition (A) preferably has a hydrolyzable chlorine content of 390 ppm or less by weight. From the viewpoint of improving the electrical properties, the epoxy resin composition (A) more preferably has a hydrolyzable chlorine content of 370 ppm or less by weight. The lower limit of the hydrolyzable chlorine content is preferably, but not particularly limited to, 10 ppm by weight in light of electrical reliability.

An example of a method for measuring the hydrolyzable chlorine content is a method in which about 0.5 g of an epoxy resin is dissolved in 20 ml of dioxane and refluxed with 5 ml of a 1 N KOH/ethanol solution for 30 minutes, and then titration is performed with a 0.01 N silver nitrate solution for quantification.

To reduce the hydrolyzable chlorine content of the epoxy resin composition (A), the epoxy resin only needs to be purified by reaction of the produced epoxy resin with an alkali in a method for producing an epoxy resin described below.

[Method for Producing Epoxy Resin Composition (A)]

A method for producing the epoxy resin composition (A) of the present invention is not particularly limited. An example thereof is a method in which 4,4'-bishydroxy-3,3',5,5'-tetramethylbiphenyl represented by formula (3) (hereinafter, also referred to as "tetramethylbiphenol (3)") is reacted with an epihalohydrin in the presence of a primary alcohol having 1 to 6 carbon atoms to give a tetramethylbiphenol-type epoxy resin, and the resulting tetramethylbiphenol-type epoxy resin is reacted with an alkali in order to control the epoxy resin (1) content and the epoxy resin (2) content of the epoxy resin composition (A).

[Chem. 5]

(3)

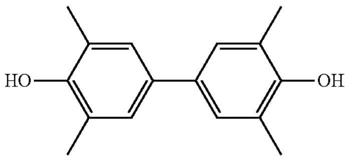

When the epoxy resin composition (A) is produced by the method, at least tetramethylbiphenol (3) and an epihalohydrin are used as raw materials. A polyhydric hydroxy compound other than tetramethylbiphenol (3) (hereinafter, also referred to as an "additional polyhydric hydroxy compound") may be used in combination to produce the epoxy resin composition (A) as a mixture of the epoxy resin (1), the epoxy resin (2), and other epoxy resins. From the viewpoint of enhancing the advantageous effects of the present invention, tetramethylbiphenol (3) is preferably used alone.

The term "polyhydric hydroxy compound" used here is a generic term for dihydric or higher phenolic compounds.

Examples of the additional polyhydric hydroxy compound include various polyhydric phenols (excluding tetramethylbiphenol (3)), such as bisphenol A, bisphenol F, bisphenol S, bisphenol AD, bisphenol AF, hydroquinone, resorcinol, methylresorcinol, biphenol, dihydroxynaphthalene, dihydroxydiphenyl ether, thiodiphenols, phenol novolac resins, cresol novolac resins, phenol aralkyl resins, biphenyl aralkyl resins, naphthol aralkyl resins, terpene phenol resins, dicyclopentadiene phenol resins, bisphenol A novolac resins, naphthol novolac resins, brominated bisphenol A, and brominated phenol novolac resins; and various phenolic resins, such as polyhydric phenolic resins prepared by condensation reaction of various phenols and aldehydes, such as benzaldehyde, hydroxybenzaldehyde, crotonaldehyde, and glyoxal, polyhydric phenolic resins prepared by condensation reaction of xylene resins and phenols, and co-condensation resins of heavy oil or pitch, phenols, and formaldehydes.

Among these, preferred examples include phenol novolac resins, phenol aralkyl resins, polyhydric phenolic resins prepared by condensation reaction of phenol and hydroxybenzaldehyde, biphenyl aralkyl resins, and naphthol aralkyl resins.

In the reaction, tetramethylbiphenol (3) used as a raw material and the additional polyhydric hydroxy compound used as needed are dissolved in an epihalohydrin and a primary alcohol having 1 to 6 carbon atoms to prepare a uniform solution.

As the epihalohydrin, epichlorohydrin or epibromohydrin is typically used. In the present invention, epichlorohydrin is preferably used.

The amount of epihalohydrin used is preferably an amount corresponding to usually 1.0 to 10.0 equivalents, particularly 2.9 to 5.9 equivalents, especially 3.0 to 5.0 equivalents, per equivalent of hydroxy groups of all polyhydric hydroxy compounds that is the total of tetramethylbiphenol (3) used as a raw material and the additional polyhydric hydroxy compound used as needed. When the amount of epihalohydrin is equal to or more than the lower limit, the reaction for increasing the molecular weight is easily controlled, and the resulting epoxy resin can have an appropriate epoxy equivalent, which is preferred. When the amount of epihalohydrin is equal to or less than the upper limit, the production efficiency tends to be improved, which is preferred.

As the primary alcohol having 1 to 6 carbon atoms present in the reaction system, specifically, it is preferable to use one or more alcohols selected from the group consisting of methanol, ethanol, 1-propanol, 1-butanol, 1-pentanol, and 1-hexanol.

The primary alcohol is usually used in an amount of 0.3 to 1.4 mol times, preferably 0.6 to 1.2 mol times, the amount of the epihalohydrin used in the reaction. When the amount of primary alcohol used is equal to or less than the upper limit, the hydrolyzable chlorine content can be reduced. When the amount of primary alcohol used is equal to or more than the lower limit, it is possible to obtain the epoxy resin composition (A) that has a high curing rate and that provides a cured product with superior productivity.

When methanol is used as the primary alcohol, $R^1$ in formula (1) is a methyl group. When ethanol is used, $R^1$ in formula (1) is an ethyl group. When 1-propanol is used, $R^1$ in formula (1) is a propyl group.

When 1-butanol is used as the primary alcohol, $R^1$ in formula (1) is a n-butyl group. When 1-pentanol is used, $R^1$ in formula (1) is a n-pentyl group. When 1-hexanol is used, $R^1$ in formula (1) is a n-hexyl group.

Next, while stirring the solution, an alkali metal hydroxide is added in the form of a solid or an aqueous solution in an amount corresponding to usually 0.5 to 2.0 equivalents, preferably 0.9 to 1.6 equivalents, per equivalent of the hydroxy group of the raw-material tetramethylbiphenol (3) (per equivalent of the hydroxy groups of tetramethylbiphenol (3) and a polyhydric hydroxy compound when the polyhydric hydroxy compound is used in combination), and reacted. When the amount of alkali metal hydroxide added is equal to or more than the lower limit, the unreacted hydroxy groups and the produced epoxy resin are not readily reacted, and it is easy to control the polymerization reaction, which is preferred. When the amount of alkali metal hydroxide added is equal to or less than the upper limit, impurities due to a side reaction are less likely to be formed, which is preferred. The alkali metal hydroxide used here is usually sodium hydroxide or potassium hydroxide.

This reaction can be performed under normal pressure or reduced pressure. The reaction temperature is preferably 20° C. to 150° C., more preferably 40° C. to 100° C., even more preferably 40° C. to 80° C. When the reaction temperature is equal to or higher than the lower limit, the reaction proceeds easily and is easily controlled, which is preferred. When the reaction temperature is equal to or lower than the upper limit, a side reaction is less likely to proceed, and chlorine impurities are easily reduced in particular, which is preferred.

The reaction is performed while carrying out dehydration by a method in which the reaction solution is azeotropically distilled while maintaining a predetermined temperature if necessary, a condensate obtained by cooling a volatile vapor is subjected to oil/water separation, and an oil component from which water has been removed is returned to the reaction system. The alkali metal hydroxide is added intermittently or continuously in small portions over a period of preferably 0.1 to 8 hours, more preferably 0.5 to 6 hours in order to suppress a rapid reaction. When the addition time of the alkali metal hydroxide is equal to or more than the lower limit, it is possible to prevent the reaction from rapidly proceeding, and it is easy to control the reaction temperature, which is preferred. When the addition time is equal to or less than the upper limit, it is preferable because chlorine impurities are less likely to be formed, and it is also preferable from the viewpoint of economy. After completion of the reaction, insoluble by-product salts can be removed by filtration, or can be removed by washing with water, and then unreacted epihalohydrin can be removed by evaporation under reduced pressure.

In this reaction, a catalyst may be used. Examples thereof include quaternary ammonium salts, such as tetramethylammonium chloride and tetraethylammonium bromide; tertiary amines, such as benzyldimethylamine and 2,4,6-tris(dimethylaminomethyl)phenol; imidazoles, such as 2-ethyl-4-methylimidazole and 2-phenylimidazole; phosphonium salts, such as ethyltriphenylphosphonium iodide; and phosphines, such as triphenylphosphine.

The epoxy resin produced as described above is purified by reaction with an alkali again. Thereby, it is possible to provide the epoxy resin composition (A), of the present invention, containing the epoxy resin (1), epoxy resin (2), and other components in the above-described amounts.

The alkali treatment conditions for producing the epoxy resin composition (A) of the present invention will be described below. The reaction time varies depending on the conditions. For this reason, a desired epoxy resin composition (A) can be obtained by appropriately performing sampling and analyzing the amount of each component and the epoxy equivalent.

In the reaction between the epoxy resin and the alkali, an organic solvent for dissolving the epoxy resin may be used. The organic solvent used in the reaction is not particularly limited. Preferably, a ketone organic solvent is used in view of production efficiency, handleability, workability, and so forth. From the viewpoint of further reducing the hydrolyzable chlorine content, a polar aprotic solvent may be used.

Examples of the ketone organic solvent include ketone solvents, such as methyl ethyl ketone, methyl isobutyl ketone, and cyclohexanone. Methyl isobutyl ketone is particularly preferable in terms of the effect and ease of post-treatment. These may be used alone or in combination as a mixture of two or more.

Examples of the polar aprotic solvent include dimethyl sulfoxide, diethyl sulfoxide, dimethyl sulfone, sulfolane, dimethylformamide, dimethylacetamide, and hexamethylphosphoramide. These may be used alone or in combination as a mixture of two or more. Among these polar aprotic solvents, dimethyl sulfoxide is preferred because it is easily available and has superior effects.

In the case of using a mixture of a ketone organic solvent and a polar aprotic solvent, the polar aprotic solvent is preferably used in such a manner that the proportion of the polar aprotic solvent is 1% to 30% by weight, particularly 5% to 20% by weight, based on the total of these solvents.

The amount of solvent used is an amount such that the concentration of the epoxy resin in the liquid to be subjected to the alkali treatment is usually 3% to 70% by weight, preferably 5% to 50% by weight, more preferably 10% to 40% by weight.

As the alkali, a solid or solution of an alkali metal hydroxide can be used. Examples of the alkali metal hydroxide include potassium hydroxide and sodium hydroxide. Sodium hydroxide is preferred.

As the alkali metal hydroxide, an alkali metal hydroxide dissolved in an organic solvent or water may be used. It is preferable to use a solution of the alkali metal hydroxide dissolved in a water solvent or an organic solvent.

The amount of alkali metal hydroxide used is preferably 0.1 parts or more by weight and 6.0 parts or less by weight based on 100 parts by weight of the epoxy resin in terms of solid content of the alkali metal hydroxide. When the amount of alkali metal hydroxide used is within this range, it is possible to easily adjust the proportion of each component of the resulting epoxy resin composition (A) within a suitable range. When the amount of alkali metal hydroxide is outside the above range, the epoxy resin composition (A) containing the epoxy resin (1), epoxy resin (2), and other components within the specified ranges can fail to be obtained of the present invention.

The reaction temperature is preferably 20° C. to 150° C., more preferably 30° C. to 90° C. The reaction time is preferably 0.1 to 15 hours, more preferably 0.3 to 10 hours. When the reaction temperature is outside the above range, the epoxy resin containing the epoxy resin (1), epoxy resin (2), and other components within the specified ranges in the present invention can fail to be obtained.

After the reaction, an excess of the alkali metal hydroxide and by-product salts are removed by a method such as washing with water, and then the organic solvent is removed by evaporation under reduced pressure and/or by steam distillation to provide the epoxy resin composition (A) of the present invention.

In the method for producing the epoxy resin composition (A) of the present invention, a method for controlling the epoxy resin (1) content of the epoxy resin composition (A) is not particularly limited. Examples thereof include the following methods.

(i) A method in which the amount of primary alcohol, having 1 to 6 carbon atoms, fed is adjusted in the production of the epoxy resin composition (A).

An increase in the amount of primary alcohol fed along with epihalohydrin tends to increase the epoxy resin (1) content of the resulting epoxy resin composition (A). In contrast, a decrease in the amount of primary alcohol tends to decrease the amount of epoxy resin (1).

(ii) A method in which the reaction temperature is adjusted in the reaction of tetramethylbiphenol (3) with epihalohydrin in the presence of a primary alcohol having 1 to 6 carbon atoms.

An increase in reaction temperature tends to increase the epoxy resin (1) content of the resulting epoxy resin composition (A). In contrast, a decrease in reaction temperature tends to decrease the epoxy resin (1) content.

(iii) A method in which the amount of alkali metal hydroxide used is adjusted.

An increase in the amount of alkali metal hydroxide tends to increase the epoxy resin (1) content of the resulting epoxy resin composition (A). In contrast, a decrease in the amount of alkali metal hydroxide tends to increase the epoxy resin (1) content of the resulting epoxy resin composition (A).

(iv) A method in which the epoxy resin composition (A) is refined.

The amounts of epoxy resin (1), epoxy resin (2), and other components can be controlled by refining.

The epoxy resin (1) content of the epoxy resin composition (A) of the present invention can be controlled mainly by controlling the conditions (i) to (iv) in combination.

[Epoxy Resin Composition (B)]

The epoxy resin composition (B) of the present invention contains at least the epoxy resin composition (A) of the present invention described above and a curing agent.

The epoxy resin composition (B) of the present invention can be mixed with, for example, other epoxy resins other than the epoxy resin composition (A) of the present invention (hereinafter, referred to simply as "other epoxy resins", in some cases), a curing accelerator, an inorganic filler, and a coupling agent, as appropriate.

When $R^1$ in formula (1) that represents the epoxy resin (1) in the present invention is a linear aliphatic hydrocarbon group having 1 to 3 carbon atoms, the epoxy resin composition (B) of the present invention containing the epoxy resin composition (A) of the present invention has a high curing rate and superior productivity of a cured product and provides a cured product that sufficiently satisfies various physical properties required for various applications. The use of the epoxy resin composition (B) of the present invention having superior curability enables an improvement in productivity in various applications.

When $R^1$ in formula (1) that represents the epoxy resin (1) in the present invention is a linear aliphatic hydrocarbon group having 4 to 6 carbon atoms, the epoxy resin composition (B) of the present invention containing the epoxy resin composition (A) of the present invention provides a cured product that has low elasticity at high temperatures and superior crack resistance and that sufficiently satisfies various physical properties required for various applications. The cured product, having superior high-temperature crack resistance, of the epoxy resin composition (B) of the present invention can be sufficiently used for applications in high-temperature environments.

[Curing Agent]

The curing agent in the present invention refers to a substance that contributes to the cross-linking reaction and/or chain extension reaction between epoxy groups of the epoxy resin.

In the present invention, even what is usually called a "curing accelerator" is regarded as a curing agent if it is a substance that contributes to the cross-linking reaction and/or chain extension reaction between epoxy groups of the epoxy resin.

The curing agent content of the epoxy resin composition (B) of the present invention is preferably 0.1 to 1,000 parts by mass, more preferably 500 parts or less by mass, even more preferably 300 parts or less by mass, based on 100 parts by mass of the total epoxy resin component as a solid content.

In the present invention, the "solid content" refers to components excluding the solvent, and includes the solid epoxy resin, a semi-solid material, and a viscous liquid material.

The "total epoxy resin component" corresponds to the amount of epoxy resin contained in the epoxy resin composition (B) of the present invention. When the epoxy resin composition (B) of the present invention contains only the epoxy resin composition (A), the "total epoxy resin component" corresponds to the amount of epoxy resin in the epoxy resin composition (A) (epoxy resin (1), epoxy resin (2), and epoxy resins other than epoxy resin (1) and epoxy resin (2) in other components). When the epoxy resin composition (B) of the present invention contains the epoxy resin composition (A) and other epoxy resins, the "total epoxy resin component" corresponds to the sum of the epoxy resin in the epoxy resin composition (A) and other epoxy resins.

The curing agent is not limited to any particular curing agent, and all those generally known as epoxy resin curing agents can be used. Examples thereof include phenolic curing agents, amine curing agents, such as aliphatic amines, polyether amines, alicyclic amines, and aromatic amines, acid anhydride curing agents, amide curing agents, tertiary amines, and imidazoles.

The epoxy resin composition (B) of the present invention containing a phenolic curing agent can have excellent heat resistance, stress resistance, moisture absorption resistance, flame retardancy, and so on. Thus, it is preferable to contain a phenolic curing agent as the curing agent. From the viewpoint of heat resistance, it is preferable to contain an acid anhydride curing agent or an amide curing agents. The use of imidazole is also preferable from the viewpoint of allowing the curing reaction to proceed sufficiently and improving the heat resistance.

A single type of curing agent may be used alone, or two or more types may be used in combination. When two or more types of curing agents are used in combination, they may be pre-mixed to prepare a curing agent mixture before use, or each of the curing agents may be separately added and mixed simultaneously when the components of the epoxy resin composition (B) are mixed.

<Phenolic Curing Agent>

Specific examples of the phenolic curing agent include various polyhydric phenols, such as bisphenol A, bisphenol F, bisphenol S, bisphenol AD, hydroquinone, resorcinol, methylresorcinol, biphenol, tetramethylbiphenol, dihydroxynaphthalene, dihydroxydiphenyl ether, thiodiphenols, phenol novolac resins, cresol novolac resins, phenol aralkyl resins, biphenyl aralkyl resins, naphthol aralkyl resins, terpene phenol resins, dicyclopentadiene phenol resins, bisphenol A novolac resins, trisphenol methane-type resins, naphthol novolac resins, brominated bisphenol A, and brominated phenol novolac resins; and various phenolic resins, such as polyhydric phenolic resins prepared by condensation reaction of various phenols and aldehydes, such as benzaldehyde, hydroxybenzaldehyde, crotonaldehyde, and glyoxal, polyhydric phenolic resins prepared by condensation reaction of xylene resins and phenols, co-condensation resins of heavy oil or pitch, phenols, and formaldehydes, phenol-benzaldehyde-xylylene dimethoxide polycondensates, phenol-benzaldehyde-xylylene dihalide polycondensates, phenol-benzaldehyde-4,4'-dimethoxide biphenyl polycondensates, and phenol-benzaldehyde-4,4'-dihalide biphenyl polycondensates.

These phenolic curing agents may be used alone or in combination of two or more in any combination and mixing ratio.

Among the above phenolic curing agents, from the viewpoints of, for example, the heat resistance of the cured composition and curability, preferred examples include phenol novolac resins (such as a compound represented by formula (4) below), phenol aralkyl resins (such as a compound represented by formula (5) below), biphenyl aralkyl resins (such as a compound represented by formula (6) below), naphthol novolac resins (such as a compound represented by formula (7) below), naphthol aralkyl resins (such as a compound represented by formula (8) below), trisphenol methane-type resins (such as a compound represented by formula (9) below), phenol-benzaldehyde-xylylene dimethoxide polycondensates (such as a compound represented by formula (10) below), phenol-benzaldehyde-xylylene dihalide polycondensates (such as a compound represented by formula (10) below), phenol-benzaldehyde-4,4'-dimethoxide biphenyl polycondensates (such as a compound represented by formula (11) below), and phenol-benzaldehyde-4,4'-dihalide biphenyl polycondensates (such as a compound represented by formula (11) below). Particularly preferred are phenol novolac resins (such as a compound represented by formula (4) below), phenol aralkyl resins (such as a compound represented by formula (5) below), biphenyl aralkyl resins (such as a compound represented by formula (6) below), phenol-benzaldehyde-xylylene dimethoxide polycondensates (such as a compound represented by formula (10) below), phenol-benzaldehyde-xylylene dihalide polycondensates (such as a compound represented by formula (10) below), phenol-benzaldehyde-4,4'-dimethoxide biphenyl polycondensates (such as a compound represented by formula (11) below), and phenol-benzaldehyde-4,4'-dihalide biphenyl polycondensates (such as a compound represented by formula (11) below).

[Chem. 6]

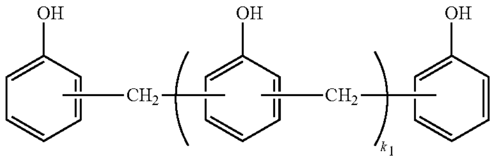

(4)

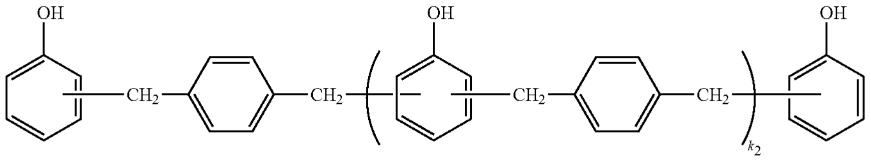

(5)

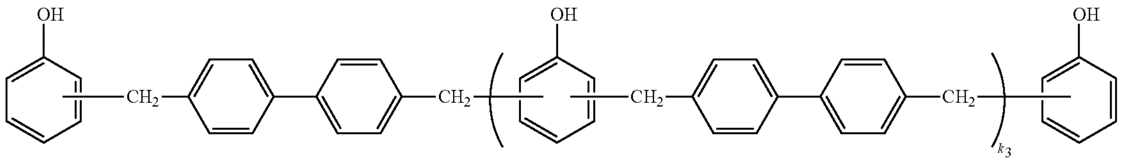

(6)

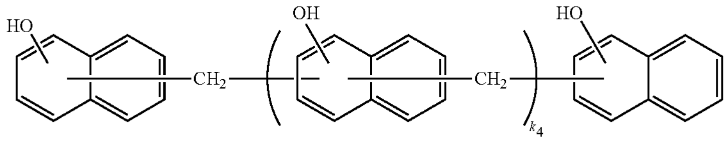

(7)

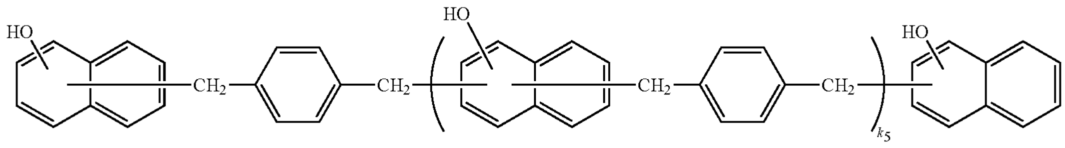

(8)

-continued (9)

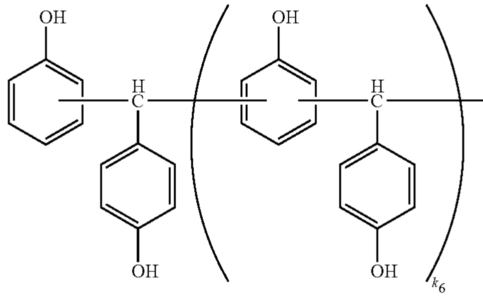

(where in formulae (4) to (9), $k_1$ to $k_6$ are each a number of 0 or more).

(10)

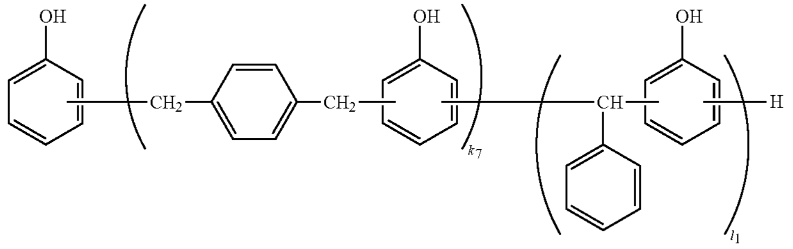

(11)

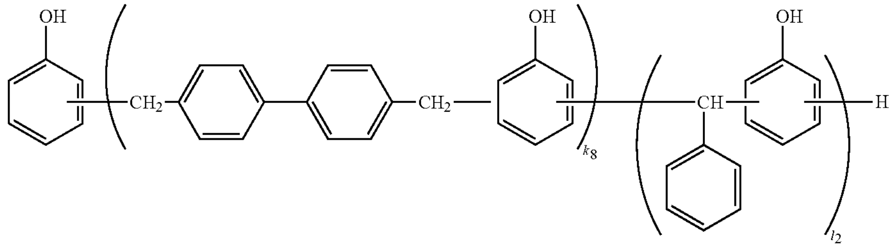

(where in formulae (10) and (11), $k_7$, $k_8$, $l_1$, and $l_2$ are each a number of 1 or more).

The amount of the phenolic curing agent added is preferably 0.1 to 1,000 parts by mass, more preferably 500 parts or less by mass, even more preferably 300 parts or less by mass, particularly preferably 100 parts or less by mass, based on 100 parts by mass of all epoxy resin components in the epoxy resin composition (B).

<Amine Curing Agent>

Examples of the amine curing agents (excluding tertiary amines) include aliphatic amines, polyether amines, alicyclic amines, and aromatic amines.

Examples of aliphatic amines include ethylenediamine, 1,3-diaminopropane, 1,4-diaminopropane, hexamethylenediamine, 2,5-dimethylhexamethylenediamine, trimethylhexamethylenediamine, diethylenetriamine, iminobispropylamine, bis(hexamethylene)triamine, triethylenetetramine, tetraethylene pentamine, pentaethylene hexamine, N-hydroxyethylenediamine, and tetra(hydroxyethyl)ethylenediamine.

Examples of polyetheramines include triethylene glycol diamine, tetraethylene glycol diamine, diethylene glycol bis(propylamine), polyoxypropylene diamine, and polyoxypropylene triamine.

Examples of the alicyclic amines include isophoronediamine, methacenediamine, N-aminoethylpiperazine, bis(4-amino-3-methyldicyclohexyl)methane, bis(aminomethyl) cyclohexane, 3,9-bis(3-aminopropyl)-2,4,8,10-tetraoxaspiro (5,5)undecane, and norbornenediamine.

Examples of the aromatic amines include tetrachloro-p-xylylenediamine, m-xylylenediamine, p-xylylenediamine, m-phenylenediamine, o-phenylenediamine, p-phenylenediamine, 2,4-diaminoanisole, 2,4-toluenediamine, 2,4-diaminodiphenylmethane, 4,4'-diaminodiphenylmethane, 4,4'-diamino-1,2-diphenylethane, 2,4-diaminodiphenyl sulfone, 4,4'-diaminodiphenyl sulfone, m-aminophenol, m-aminobenzylamine, benzyldimethylamine, 2-(dimethylaminomethyl)phenol, triethanolamine, methylbenzylamine, α-(m-aminophenyl)ethylamine, α-(p-aminophenyl)ethylamine, diaminodiethyldimethyldiphenylmethane, and α,α'-bis(4-aminophenyl)-p-diisopropylbenzene.

These amine curing agents may be used alone or in combination of two or more in any combination and mixing ratio.

Such an amine curing agent is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

Examples of the tertiary amines include 1,8-diazabicyclo (5,4,0)undesen-7, triethylenediamine, benzyldimethylamine, triethanolamine, dimethylaminoethanol, and tris(dimethylaminomethyl)phenol.

These tertiary amines may be used alone or in combination of two or more in any combination and mixing ratio.

Such a tertiary amine is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

<Acid Anhydride Curing Agent>

Examples of the acid anhydride curing agent include acid anhydrides and modified acid anhydrides.

Examples of acid anhydrides include phthalic anhydride, trimellitic anhydride, pyromellitic anhydride, benzophenonetetracarboxylic anhydride, dodecenylsuccinic anhydride, poly(adipic anhydride), poly(azelaic anhydride), poly(sebacic anhydride), poly(ethyloctadecanedioic anhydride), poly(hexadecanedioic anhydride), tetrahydrophthalic anhydride, methyltetrahydrophthalic anhydride, methylhexahydrophthalic anhydride, hexahydrophthalic anhydride, methylhimic anhydride, trialkyltetrahydrophthalic anhydride, methylcyclohexenedicarboxylic anhydride, methylcyclohexanetetracarboxylic anhydride, ethylene glycol bis(trimellitic dianhydride), het anhydride, nadic anhydride, methyl nadic anhydride, 5-(2,5-dioxotetrahydro-3-furanyl)-3-methyl-3-cyclohexane-1,2-dicarboxylic anhydride, 3,4-dicarboxy-1,2,3,4-tetrahydro-1-naphthalene succinic dianhydride, and 1-methyl-dicarboxy-1,2,3,4-tetrahydro-1-naphthalene succinic dianhydride.

Examples of modified acid anhydrides include products obtained by modifying the above-described acid anhydrides with glycols. Examples of glycols that can be used for the modification include alkylene glycols, such as ethylene glycol, propylene glycol, and neopentyl glycol, and polyether glycols, such as polyethylene glycols, polypropylene glycols, and polytetramethylene glycols. Furthermore, polyether glycol copolymers of two or more types of these glycols and/or polyether glycols can also be used.

For such a modified acid anhydride, it is preferable to modify 1 mol of an acid anhydride with 0.4 mol or less of a glycol. When the amount of modification is less than or equal to the above-mentioned upper limit, the epoxy resin composition does not have an excessively high viscosity and thus tends to have good workability, and the rate of the curing reaction with the epoxy resin also tends to be good.

These acid anhydride curing agents may be used alone or in combination of two or more in any combination and amount mixed.

When such an acid anhydride curing agent is used, the acid anhydride curing agent is preferably used in such a manner that the equivalent ratio of functional groups in the curing agent to epoxy groups in all epoxy resin components in the epoxy resin composition (B) is in the range of 0.8 to 1.5. Within this range, unreacted epoxy groups and functional groups of the curing agent are less likely to remain, which is preferred.

<Amide Curing Agent>

Examples of the amide curing agents include dicyandiamide and derivatives thereof and polyamide resins.

The amide curing agents may be used alone or in combination of two or more in any combination and ratio.

When such an amide curing agent is used, the amide curing agent is preferably used in an amount of 0.1% to 20% by mass based on the total of all epoxy resin components in the epoxy resin composition (B) and the amide curing agent.

<Imidazoles>

Examples of the imidazoles include 2-phenylimidazole, 2-ethyl-4(5)-methylimidazole, 2-phenyl-4-methylimidazole, 1-benzyl-2-methylimidazole, 1-benzyl-2-phenylimidazole, 1-cyanoethyl-2-undecylimidazole, 1-cyano-2-phenylimidazole, 1-cyanoethyl-2-undecylimidazole trimellitate, 1-cyanoethyl-2-phenylimidazolium trimellitate, 2,4-diamino-6-[2'-methylimidazolyl-(1')]-ethyl-s-triazine, 2,4-diamino-6-[2'-ethyl-4'-methylimidazolyl-(1')]-ethyl-s-triazine, an isocyanuric acid adduct of 2,4-diamino-6-[2'-methylimidazolyl-(1')]-ethyl-s-triazine, an isocyanuric acid adduct of 2-phenylimidazole, 2-phenyl-4,5-dihydroxymethylimidazole, 2-phenyl-4-methyl-5-hydroxymethylimidazole, and adducts of epoxy resins and the above imidazoles.

Imidazoles can also be commonly classified as curing accelerators because of their catalytic ability. In this invention, however, they are classified as curing agents.

These imidazoles may be used alone or in combination of two or more in any combination and ratio.

When such an imidazole is used, the imidazole is preferably used in an amount of 0.1% to 20% by mass based on the total of all epoxy resin components in the epoxy resin composition (B) and the imidazole.

<Other Curing Agents>

In the epoxy resin composition (B) of the present invention, other curing agents can be used in addition to the curing agent. Other curing agents are not particularly limited. All curing agents that are commonly known as curing agents for epoxy resins can be used.

Other curing agents may be used alone or in combination of two or more.

[Other Epoxy Resins]

The epoxy resin composition (B) of the present invention can further contain other epoxy resins in addition to the epoxy resin composition (A) described above. The incorporation of other epoxy resins enables improvements in the heat resistance, stress resistance, moisture resistance, and flame retardancy of the epoxy resin composition (B) of the present invention.

Other epoxy resins that can be used in the epoxy resin composition (B) of the present invention are all epoxy resins other than the epoxy resins (mainly epoxy resin (1) and epoxy resin (2)) contained in the epoxy resin composition (A) described above.

Specific examples thereof include bisphenol A-type epoxy resins, trisphenol methane-type epoxy resins, anthracene-type epoxy resins, phenol-modified xylene resin-type epoxy resins, bisphenol cyclododecyl-type epoxy resins, bisphenol diisopropylidene resorcinol-type epoxy resins, bisphenol F-type epoxy resins, bisphenol AD-type epoxy resins, hydroquinone-type epoxy resins, methylhydroquinone-type epoxy resins, dibutylhydroquinone-type epoxy resins, resorcinol-type epoxy resins, methylresorcinol-type epoxy resins, biphenol-type epoxy resins, tetramethylbiphenol-type epoxy resins other than the epoxy resins (1) and (2) in the epoxy resin composition (A), tetramethylbisphenol F-type epoxy resins, dihydroxydiphenyl ether-type epoxy resins, epoxy resins derived from thiodiphenols, dihydroxynaphthalene-type epoxy resins, dihydroxyanthracene-type epoxy resins, dihydroxydihydroanthracene-type epoxy resins, dicyclopentadiene-type epoxy resins, epoxy resins derived from dihydroxystilbenes, phenol novolac-type epoxy resins, cresol novolac-type epoxy resins, bisphenol A-type novolac epoxy resins, naphthol novolac-type epoxy resins, phenol aralkyl-type epoxy resins, naphtholaralkyltype epoxy resins, biphenylaralkyl-type epoxy resins, terpenephenol-type epoxy resins, dicyclopentadienephenol-type epoxy resins, epoxy resins derived from condensation products of phenol and hydroxybenzaldehyde, epoxy resins derived from condensation products of phenol and crotonaldehyde, epoxy resins derived from condensation products of phenol and glyoxal, epoxy resins derived from co-condensation resins of phenols and formaldehyde with heavy oils or pitches, epoxy resins derived from diaminodiphenylmethane, epoxy resins derived from aminophenols, epoxy resins derived from xylenediamines, epoxy resins derived from methylhexahydrophthalic acid, and epoxy resins derived from dimer acids.

These may be used alone or in combination of two or more in any combination and mixing ratio.

Among the above-described epoxy resins, from the viewpoints of, for example, the flowability of the composition and the heat resistance, moisture resistance, and flame retardancy of a cured product, particularly preferred are bisphenol A-type epoxy resins, tetramethylbiphenol-type epoxy resins other than the epoxy resin (1) or epoxy resin (2) in the epoxy resin composition (A), 4,4'-biphenol-type epoxy resins, biphenylaralkyl-type epoxy resins, phenol aralkyl-type epoxy resins, dihydroxyanthracene-type epoxy resins, dicyclopentadiene-type epoxy resins, o-cresol novolac-type epoxy resins, and trisphenol methane-type epoxy resins.

When the epoxy resin composition (B) of the present invention contains other epoxy resins described above, the other epoxy resin content is preferably 0.01 to 60 parts by weight, more preferably 40 parts or less by weight, even more preferably 30 parts or less by weight, particularly preferably 20 parts or less by weight, and more preferably 1 part or more by weight, based on 100 parts by weight of all the epoxy resin components in the composition.

[Curing Accelerator]

The epoxy resin composition (B) of the present invention preferably contains a curing accelerator. The incorporation of the curing accelerator enables shortening of the curing time and lowering of the curing temperature, facilitating the production of the desired cured product.

Specific examples of the curing accelerator include, but are not limited to, phosphorus-containing compounds, such as organophosphines and phosphonium salts, tetraphenylboron salts, organic acid dihydrazides, and boron halide amine complexes.

Examples of phosphorus-containing compounds that can be used as curing accelerators include organophosphines, such as triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphines, dialkylarylphosphines, and alkyldiarylphosphines; complexes of these organophosphines with organoborons; and adduct compounds of these organophosphines and compounds such as maleic anhydride, quinone compounds, e.g., 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone, and diazophenylmethane.

Among the above-mentioned curing accelerators, organophosphines and phosphonium salts are preferred. Organophosphines are most preferred.

A single type of curing accelerator among the above-mentioned curing accelerators may be used alone or in combination as a mixture of two or more in any combination and ratio.

The curing accelerator is preferably used in a range of 0.1 weight to 20 parts by mass, more preferably 0.5 parts or more by mass, even more preferably 1 part or more by mass, more preferably 15 parts or less by mass, even more preferably 10 parts or less by mass, based on 100 parts by mass of all epoxy resin components in the epoxy resin composition (B). When the curing accelerator content is more than or equal to the lower limit described above, a good curing acceleration effect can be provided. When the curing accelerator content is less than or equal to the above upper limit, the desired curing properties are easily obtained, which is preferred.

[Inorganic Filler]

An inorganic filler can be incorporated in the epoxy resin composition (B) of the present invention. Examples of the inorganic filler include fused silica, crystalline silica, glass powders, alumina, calcium carbonate, calcium sulfate, talc, and boron nitride. These may be used alone or in combination of two or more in any combination and mixing ratio. Of these, crushed and/or spherical, fused and/or crystalline silica powder fillers are preferred for semiconductor-encapsulation applications.

When the epoxy resin composition (B) is used as a semiconductor-encapsulating material, the use of the inorganic filler enables the coefficient of thermal expansion of the semiconductor-encapsulating material to be brought close to those of the internal silicon chip and lead frame. In addition, the amount of moisture absorbed by the entire semiconductor-encapsulating material can be reduced, thus improving solder crack resistance.

The inorganic filler usually has an average particle size of 1 to 50 μm, preferably 1.5 to 40 μm, more preferably 2 to 30 μm. When the average particle size is equal to or more than the lower limit value, the melt viscosity is not too high, and the flowability is not easily decreased, which is preferred. When the average particle size of the inorganic filler is equal to or less than the upper limit value, the filler is less likely to lead to clogging of the narrow gap of a mold during molding, and the filling properties of the material are easily improved, which is preferred.

When the inorganic filler is used for the epoxy resin composition (B) of the present invention, the inorganic filler is preferably incorporated in the range of 60% to 95% by weight of the entire epoxy resin composition.

[Mold Release Agent]

The epoxy resin composition (B) of the present invention can be mixed with a mold release agent. Examples of the mold release agent that can be used include natural waxes, such as carnauba wax, synthetic waxes, such as polyethylene wax, higher fatty acids, such as stearic acid and zinc stearate, and metal salts thereof, and hydrocarbon mold release agents, such as paraffin. These may be used alone or in combination of two or more in any combination and mixing ratio.

When the epoxy resin composition (B) of the present invention is mixed with the mold release agent, the amount of the mold release agent mixed is preferably 0.1 to 5.0 parts by mass, more preferably 0.5 to 3.0 parts by mass, based on 100 parts by mass of all epoxy resin components in the epoxy resin composition (B). When the amount of the mold release agent mixed is within the above range, good releasability can be achieved while the curing properties of the epoxy resin composition (B) are maintained, which is preferred.

[Coupling Agent]

The epoxy resin composition (B) of the present invention is preferably mixed with a coupling agent. The coupling agent is preferably used in combination with the inorganic filler. The incorporation of the coupling agent enables an improvement in the adhesion between the epoxy resin serving as the matrix and the inorganic filler. Examples of the coupling agent include silane coupling agents and titanate coupling agents.

Examples of the silane coupling agent include epoxy silanes, such as γ-glycidoxypropyltrimethoxysilane, γ-glycidoxypropyltriethoxysilane, and β-(3,4-epoxycyclohexyl) ethyltrimethoxysilane; aminosilanes, such as γ-aminopropyltriethoxysilane, N-β(aminoethyl)γ-aminopropyltrimethoxysilane, N-β(aminoethyl)γ-aminopropylmethyldimethoxysilane, γ-aminopropyltrimethoxysilane, and γ-ureidopropyltriethoxysilane; mercaptosilanes, such as 3-mercaptopropyltrimethoxysilane; vinylsilanes, such as p-styryltrimethoxysilane, vinyltrichlorosilane, vinyltris(β-methoxyethoxy)silane, vinyltrimethoxysilane, vinyltriethoxysilane, and γ-methacryloxypropyltrimethoxysilane; and epoxy, amino, and vinyl polymer-type silanes.

Examples of the titanate coupling agent include isopropyl triisostearoyl titanate, isopropyl tri(N-aminoethyl-aminoethyl) titanate, diisopropyl bis(dioctylphosphate) titanate, tetraisopropyl bis(dioctyl phosphite) titanate, tetraoctyl bis (ditridecylphosphite) titanate, tetra(2,2-diallyloxymethyl-1-butyl) bis(ditridecyl)phosphite titanate, bis(dioctylpyrophosphate) oxyacetate titanate, and bis(dioctylpyrophosphate) ethylene titanate.

These coupling agents may be used alone or in combination of two or more in any combination and ratio.

When the coupling agent is used for the epoxy resin composition (B) of the present invention, the amount of the coupling agent mixed is preferably 0.1 to 3.0 parts by mass based on 100% by mass of all epoxy resin components. When the amount of the coupling agent mixed is more than or equal to the lower limit described above, the effect of incorporating the coupling agent on an improvement in the adhesion between the epoxy resin serving as a matrix and the inorganic filler tends to be improved. When the amount of the coupling agent mixed is less than or equal to the upper limit described above, the coupling agent is less likely to bleed out from the resulting cured product, which is preferred.

[Other Mixing Components]

The epoxy resin composition (B) of the present invention can be mixed with components other than those described above (sometimes referred to as "other mixing components" in the present invention). Examples of other mixing components include flame retardants, plasticizers, reactive diluents, and pigments, which can be appropriately incorporated as needed. Components other than those described above may be incorporated into the epoxy resin composition (B) of the present invention.

Examples of the flame retardants used in the epoxy resin composition (B) of the present invention include halogenated flame retardants, such as brominated epoxy resins and brominated phenolic resins; antimony compounds, such as antimony trioxide; phosphorus flame retardants, such as red phosphorus, phosphates, and phosphines; nitrogen-containing flame retardants, such as melamine derivatives; and inorganic flame retardants, such as aluminum hydroxide and magnesium hydroxide.

[Cured Product]

When $R^1$ in formula (1) that represents the epoxy resin (1) of the present invention is a linear aliphatic hydrocarbon group having 1 to 3 carbon atoms, curing the epoxy resin composition (B) of the present invention makes it possible to provide a cured product having a low hydrolyzable chlorine content and superior electrical properties with good productivity.

When $R^1$ in formula (1) that represents the epoxy resin (1) of the present invention is a linear aliphatic hydrocarbon group having 4 to 6 carbon atoms, curing the epoxy resin composition (B) of the present invention makes it possible to provide a cured product having a low hydrolyzable chlorine content, superior electrical properties, and superior high-temperature crack resistance.

A method for curing the epoxy resin composition (B) of the present invention is not particularly limited. The cured product can be usually produced through a thermosetting reaction by heating. The curing temperature during the thermosetting reaction is preferably selected in accordance with the type of curing agent used, as appropriate. For example, when a phenolic curing agent is used, the curing temperature is usually 130° C. to 300° C. The addition of the curing accelerators to these curing agents can also reduce their curing temperatures. The reaction time is preferably 1 to 20 hours, more preferably 2 to 18 hours, even more preferably 3 to 15 hours. At a reaction time of more than or equal to the lower limit described above, the curing reaction tends to proceed sufficiently, which is preferable. At a reaction time of less than or equal to the upper limit described above, a deterioration due to heating and energy loss during heating can be easily reduced, which is preferable.

[Applications]

When $R^1$ in formula (1) that represents the epoxy resin (1) of the present invention is a linear aliphatic hydrocarbon group having 1 to 3 carbon atoms, the epoxy resin composition (A) of the present invention has a low hydrolyzable chlorine content and superior electrical properties, and the epoxy resin composition (B) of the present invention which contains the epoxy resin composition (A) of the present invention has a high curing rate and superior productivity of a cured product.

When $R^1$ in formula (1) that represents the epoxy resin (1) of the present invention is a linear aliphatic hydrocarbon group having 4 to 6 carbon atoms, the epoxy resin composition (A) of the present invention has a low hydrolyzable chlorine content and superior electrical properties, and the epoxy resin composition (B) of the present invention which contains the epoxy resin composition (A) of the present invention can provide a cured product having superior high-temperature crack resistance.

The epoxy resin composition (A) and the epoxy resin composition (B) and its cured product of the present invention can be effectively used in any application where these properties are required. They can be suitably used in any of the following applications: for example, paint fields, such as electrodeposition paints for automobiles, heavy-duty anticorrosion paints for ships and bridges, and paints for coating the inner surface of beverage cans; electrical and electronic fields, such as laminates, semiconductor-encapsulating materials, insulating powder paints, and coil impregnation; civil engineering, construction, and adhesives fields, such as seismic reinforcement of bridges, concrete reinforcement, flooring materials for buildings, linings for water supply facilities, drainage and permeable pavement, and adhesives for vehicles and aircraft. Among these, they are particularly useful for electrical or electronic applications such as semiconductor-encapsulating materials and laminates.

The epoxy resin composition (B) of the present invention may be cured and then used for the aforementioned applications, or may be cured in production processes for the aforementioned applications and then used.

EXAMPLES

The present invention will be more specifically described below based on the following examples. The present invention is not limited to these Examples at all.

The values of various production conditions and evaluation results in the following Examples have meanings as preferred values of the upper limit or the lower limit in the embodiment of the present invention. A preferred range may be a range defined by a combination of the above upper limit or lower limit and the values of following Examples or a combination of values of Examples.

[Production and Evaluation of Epoxy Resin Composition (A)]

[Measurement and Evaluation Method]

Measurements and evaluations of the physical properties and other properties of the epoxy resin composition (A) were performed as described below.

<Composition of Epoxy Resin Composition (A)>

Regarding the proportions of the epoxy resin (1), epoxy resin (2-0), epoxy resin (2-1), and other components, LC analysis was performed with an instrument and conditions described below in accordance with JIS K0124. The area percentages of the areas of the epoxy resin (2-0), epoxy resin (2-1), and other components on the LC chart are defined as the respective proportions of the epoxy resin (1), epoxy resin (2-0), epoxy resin (2-1), and other components (% by weight).

Instrument: Waters 2690 High Performance Liquid Chromatography, available from Waters Corporation Column: TSKgel ODS-120A (column dimensions: 4.6 mm I.D.×15 cm), available from Tosoh Corporation Eluent: gradient analysis of acetonitrile/water=30/70 to 100/0 in 60 min Flow rate: 1 ml/min Detector: UV (280 nm)

Temperature: 35° C.

Sample concentration: 0.1%

Amount injected: 10 μl

Peak area analysis software: Waters Empower 2

<Epoxy Equivalent>

The epoxy equivalent is defined as "the mass of an epoxy resin containing one equivalent of epoxy groups" and was measured in accordance with JIS K7236.

<Hydrolyzable Chlorine Content>

The hydrolyzable chlorine content was quantified by dissolving about 0.5 g of an epoxy resin in 20 ml of dioxane, refluxing the solution with 5 ml of a 1 N KOH/ethanol solution for 30 minutes, and performing titration with a 0.01 N silver nitrate solution.

Example I-1

Into a 5-L four-necked flask equipped with a thermometer, a stirrer, and a condenser tube, 200 g of tetramethylbiphenol (available from Mitsubishi Chemical Corporation), 765 g of epichlorohydrin (5.0 equivalents per equivalent of hydroxy groups of tetramethylbiphenol), and 159 g of methanol (methanol: 0.6 mol times the amount of epichlorohydrin) were placed. The temperature was increased to 40° C. to uniformly dissolve the mixture. Thereafter, 158 g (1.15 equivalents per equivalent of hydroxy groups of tetramethylbiphenol) of a 48.5 wt % aqueous solution of sodium hydroxide was added dropwise over 90 minutes. Simultaneously with the dropwise addition, the temperature was increased from 40° C. to 65° C. over 90 minutes. Thereafter, the mixture was maintained at 65° C. for 30 minutes to complete the reaction. The reaction solution was transferred to a 5-L separating funnel. To the funnel, 500 g of warm water having a temperature of 65° C. was added, thereby cooling the mixture to 65° C. The mixture was allowed to stand for 1 hour. After the standing, the aqueous layer was drained from the separated oil and water layers to remove by-product salts and excess sodium hydroxide. Then, epichlorohydrin was completely removed under reduced pressure at 150° C.

After that, 434 g of methyl isobutyl ketone was added thereto (epoxy resin concentration: 40% by weight). The temperature was increased to 65° C. to uniformly dissolve the mixture. Then, 6.2 g (the amount of NaOH based on the epoxy resin: 1.0% by weight) of a 48.5 wt % aqueous solution of sodium hydroxide was added thereto. The reaction was conducted for 60 minutes. The resulting mixture was washed with 400 g of water four times. Then, methyl isobutyl ketone was completely removed under reduced pressure at 150° C. to give an epoxy resin composition (AI-1) of Example 1.

Table 1 presents the composition of the epoxy resin composition (AI-1) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-1) was only an epoxy resin having a structure represented by formula (1) where $R^1$ was a methyl group.

Example I-2

An epoxy resin composition (AI-2) was produced in the same manner as in Example I-1, except that the amount of methanol placed into the four-necked flask was 239 g (methanol: 0.9 mol times the amount of epichlorohydrin).

Table 1 presents the composition of the epoxy resin composition (AI-2) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-2) was only an epoxy resin represented by formula (1) where $R^1$ was a methyl group.

Example I-3

An epoxy resin composition (AI-3) was produced in the same manner as in Example I-1, except that the amount of methanol placed into the four-necked flask was 318 g (methanol: 1.2 mol times the amount of epichlorohydrin).

Table 1 presents the composition of the epoxy resin composition (AI-3) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-3) was only an epoxy resin represented by formula (1) where $R^1$ was a methyl group.

Example I-4

An epoxy resin composition (AI-4) was produced in the same manner as in Example I-1, except that 229 g of ethanol (ethanol: 0.6 mol times the amount of epichlorohydrin) instead of 159 g of methanol was placed into the four-necked flask.

Table 1 presents the composition of the epoxy resin composition (AI-4) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-4) was only an epoxy resin represented by formula (1) where $R^1$ was an ethyl group.

Example I-5

An epoxy resin composition (AI-5) was produced in the same manner as in Example I-1, except that 343 g of ethanol (ethanol: 0.9 mol times the amount of epichlorohydrin) instead of 159 g of methanol was placed into the four-necked flask.

Table 1 presents the composition of the epoxy resin composition (AI-5) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-5) was only an epoxy resin represented by formula (1) where $R^1$ was an ethyl group.

Example I-6

An epoxy resin composition (AI-6) was produced in the same manner as in Example I-1, except that 457 g of ethanol (ethanol: 1.2 mol times the amount of epichlorohydrin) instead of 159 g of methanol was placed into the four-necked flask.

Table 1 presents the composition of the epoxy resin composition (AI-6) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-6) was only an epoxy resin represented by formula (1) where $R^1$ was an ethyl group.

Example I-7

An epoxy resin composition (AI-7) was produced in the same manner as in Example I-1, except that 298 g of 1-propanol (1-propanol: 0.6 mol times the amount of epichlorohydrin) instead of 159 g of methanol was placed into the four-necked flask.

Table 1 presents the composition of the epoxy resin composition (AI-7) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-7) was only an epoxy resin represented by formula (1) where $R^1$ was a n-propyl group.

Example I-8

An epoxy resin composition (AI-8) was produced in the same manner as in Example I-1, except that 447 g of 1-propanol (1-propanol: 0.9 mol times the amount of epichlorohydrin) instead of 159 g of methanol was placed into the four-necked flask.

Table 1 presents the composition of the epoxy resin composition (AI-8) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-8) was only an epoxy resin represented by formula (1) where $R^1$ was a n-propyl group.

Example I-9

An epoxy resin composition (AI-9) was produced in the same manner as in Example I-1, except that 596 g of 1-propanol (1-propanol: 1.2 mol times the amount of epichlorohydrin) instead of 159 g of methanol was placed into the four-necked flask.

Table 1 presents the composition of the epoxy resin composition (AI-9) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AI-9) was only an epoxy resin represented by formula (1) where $R^1$ was a n-propyl group.

Comparative Example I-1

An epoxy resin composition (AI-10) was produced in the same manner as in Example I-1, except that methanol was not placed into the four-necked flask.

Table 1 presents the composition of the epoxy resin composition (AI-10) (the proportions (% by weight) of the epoxy resin (1), epoxy resin (2-0), epoxy resin (2-1), and other components), the epoxy equivalent (g/equivalent), and the hydrolyzable chlorine content (ppm by weight).

Comparative Example I-2

An epoxy resin composition (AI-11) was produced in the same manner as in Example I-1, except that 298 g of 2-propanol (2-propanol: 0.6 mol times the amount of epichlorohydrin) instead of 159 g of methanol was placed into the four-necked flask.

Table 1 presents the composition of the epoxy resin composition (AI-11) (the proportions (% by weight) of the epoxy resin (1), epoxy resin (2-0), epoxy resin (2-1), and other components), the epoxy equivalent (g/equivalent), and the hydrolyzable chlorine content (ppm by weight).

TABLE 1

| Epoxy resin composition | | | Example 1-1 (AI-) | I-2 (AI-2) | 1-3 (AI-3) | I-4 (AI-4) | I-5 (AI-5) | I-6 (AI-6) | I-7 (AI-7) | I-8 (AI-8) | I-9 (AI-9) | Comparative example 1-1 (AI-10) | I-2 (AI-11) |
|---|---|---|---|---|---|---|---|---|---|---|---|---|---|
| Composition | Epoxy resin (1) | % by weight | 0.2 | 2.0 | 4.1 | 0.3 | 2.3 | 4.3 | 0.3 | 2.4 | 4.5 | 0 | 0 |
| | Epoxy resin (2-0) | % by weight | 88.2 | 86.3 | 83.8 | 87.5 | 85.9 | 83.8 | 88.2 | 85.7 | 83.8 | 81.7 | 82.8 |
| | Epoxy resin (2-1) | % by weight | 4.8 | 6.7 | 9.2 | 5.5 | 7.1 | 9.2 | 5.1 | 6.9 | 8.8 | 7.7 | 10.3 |
| | Others | % by weight | 6.8 | 5.0 | 2.9 | 6.7 | 4.7 | 2.7 | 6.4 | 5.0 | 2.9 | 10.6 | 6.9 |
| Epoxy equivalent | | g/equivalent | 184 | 189 | 192 | 186 | 189 | 192 | 185 | 189 | 192 | 193 | 193 |
| Hydrolyzable chlorine content | | ppm by weight | 120 | 180 | 230 | 190 | 240 | 280 | 210 | 240 | 300 | 720 | 400 |

[Production and Evaluation of Curability of Epoxy Resin Composition (B)]

Examples I-10 to I-18 and Comparative Examples I-3 and I-4

<Measurement of Gel Time at 175° C.>

The epoxy resin compositions (AI-1) to (AI-11) of Examples I-1 to I-9 and Comparative examples I-1 and I-2 were each mixed with a curing agent (phenol aralkyl resin (trade name: MEH7800SS, available from Meiwa Plastic Industries, Ltd.)) and a curing catalyst (triphenylphosphine (trade name: Hokuko TPP, available from Hokko Chemical Industry Co., Ltd.)) in the proportions given in Table 2 to prepare epoxy resin compositions (BI-1) to (BI-11). The time required for gelation of these compositions was measured on a hot plate heated to 175° C. Table 2 presents the results. The term “part” in Table 2 refers to “part (s) by weight”.

Table 2 indicates that the epoxy resin compositions (B) of Examples I-10 to I-18 have shorter gel times than the epoxy resin compositions (B) of Comparative examples I-3 and I-4 and thus are excellent in productivity of cured products.

Example II-1

Into a 5-L four-necked flask equipped with a thermometer, a stirrer, and a condenser tube, 200 g of tetramethylbiphenol (available from Mitsubishi Chemical Corporation), 765 g of epichlorohydrin (5.0 equivalents per equivalent of hydroxy groups of tetramethylbiphenol), and 183 g of 1-butanol (1-butanol: 0.3 mol times the amount of epichlorohydrin) were placed. The temperature was increased to 40° C. to uniformly dissolve the mixture. Thereafter, 158 g (1.15 equivalents per equivalent of hydroxy groups of tetramethylbiphenol) of a 48.5 wt % aqueous solution of sodium hydroxide was added dropwise over a period of 90 minutes. Simultaneously with the dropwise addition, the temperature was increased from 40° C. to 65° C. over 90 minutes. Thereafter, the mixture was maintained at 65° C. for 30 minutes to complete the reaction. The reaction solution was transferred to a 5-L separating funnel. To the funnel, 500 g of warm water having a temperature of 65° C. was added, thereby cooling the mixture to 65° C. The mixture was allowed to stand for 1 hour. After the standing, the aqueous layer was drained from the separated oil and water layers to

TABLE 2

| Epoxy resin composition | | | Example I-10 (BI-1) | I-11 (BI-2) | I-12 (BI-3) | I-13 (BI-4) | I-14 (BI-5) | I-15 (BI-6) | I-16 (BI-7) | I-17 (BI-8) | I-18 (BI-9) | Comparative example I-3 (BI-10) | I-4 (BI-11) |
|---|---|---|---|---|---|---|---|---|---|---|---|---|---|
| Formulation of epoxy resin composition | (AI-1) | part | 100 | | | | | | | | | | |
| | (AI-2) | part | | 100 | | | | | | | | | |
| | (AI-3) | part | | | 100 | | | | | | | | |
| | (AI-4) | part | | | | 100 | | | | | | | |
| | (AI-5) | part | | | | | 100 | | | | | | |
| | (AI-6) | part | | | | | | 100 | | | | | |
| | (AI-7) | part | | | | | | | 100 | | | | |
| | (AI-8) | part | | | | | | | | 100 | | | |
| | (AI-9) | part | | | | | | | | | 100 | | |
| | (AI-10) | part | | | | | | | | | | 100 | |
| | (AI-11) | part | | | | | | | | | | | 100 |
| | Curing agent | part | 93 | 92 | 91 | 93 | 92 | 91 | 93 | 92 | 91 | 90 | 90 |
| | Curing catalyst | part | 1 | 1 | 1 | 1 | 1 | 1 | 1 | 1 | 1 | 1 | 1 |
| Gel time | | second | 75 | 78 | 80 | 76 | 77 | 81 | 78 | 80 | 82 | 95 | 85 |

[Evaluation of Results]

Table 1 indicates that the epoxy resin compositions (A), each containing the epoxy resin (1), of Examples I-1 to I-9 have a lower hydrolyzable chlorine content than the epoxy resin compositions (A), each containing no epoxy resin (1), of Comparative examples I-1 and I-2, and thus have superior electrical properties.

remove by-product salts and excess sodium hydroxide. Then, epichlorohydrin was completely removed under reduced pressure at 150° C.

After that, 434 g of methyl isobutyl ketone was added thereto (epoxy resin concentration: 40% by weight). The temperature was increased to 65° C. to uniformly dissolve the mixture. Then, 6.2 g (the amount of NaOH based on the epoxy resin was 1.0% by weight) of a 48.5 wt % aqueous solution of sodium hydroxide was added thereto. The reaction was conducted for 60 minutes. The mixture was washed with 400 g of water four times. Then, methyl isobutyl ketone was completely removed under reduced pressure at 150° C. to give an epoxy resin composition (AII-1) of Example 1.

Table 3 presents the composition of the epoxy resin composition (AII-1) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-1) was only an epoxy resin represented by formula (1) where $R^1$ was a n-butyl group.

Example II-2

An epoxy resin composition (AII-2) was produced in the same manner as in Example II-1, except that the amount of 1-butanol placed into the four-necked flask was 275 g (1-butanol: 0.45 mol times the amount of epichlorohydrin).

Table 3 presents the composition of the epoxy resin composition (AII-2) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-2) was only an epoxy resin represented by formula (1) where $R^1$ was a n-butyl group.

Example II-3

An epoxy resin composition (AII-3) was produced in the same manner as in Example II-1, except that the amount of 1-butanol placed into the four-necked flask was 366 g (1-butanol: 0.6 mol times the amount of epichlorohydrin).

Table 3 presents the composition of the epoxy resin composition (AII-3) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-3) was only an epoxy resin represented by formula (1) where $R^1$ was a n-butyl group.

Example II-4

An epoxy resin composition (AII-4) was produced in the same manner as in Example II-1, except that 218 g of 1-pentanol (1-pentanol: 0.3 mol times the amount of epichlorohydrin) instead of 183 g of 1-butanol was placed into the four-necked flask.

Table 3 presents the composition of the epoxy resin composition (AII-4) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-4) was only an epoxy resin represented by formula (1) where $R^1$ was a n-pentyl group.

Example II-5

An epoxy resin composition (AII-5) was produced in the same manner as in Example II-1, except that 326 g of 1-pentanol (1-pentanol: 0.45 mol times the amount of epichlorohydrin) instead of 183 g of 1-butanol was placed into the four-necked flask.

Table 3 presents the composition of the epoxy resin composition (AII-5) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-5) was only an epoxy resin represented by formula (1) where $R^1$ was a n-pentyl group.

Example II-6

An epoxy resin composition (AII-6) was produced in the same manner as in Example II-1, except that 435 g of 1-pentanol (1-pentanol: 0.6 mol times the amount of epichlorohydrin) instead of 183 g of 1-butanol was placed into the four-necked flask.

Table 3 presents the composition of the epoxy resin composition (AII-6) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-6) was only an epoxy resin represented by formula (1) where $R^1$ was a n-pentyl group.

Example II-7

An epoxy resin composition (AII-7) was produced in the same manner as in Example II-1, except that 252 g of 1-hexanol (1-hexanol: 0.3 mol times the amount of epichlorohydrin) instead of 183 g of 1-butanol was placed into the four-necked flask.

Table 3 presents the composition of the epoxy resin composition (AII-7) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-7) was only an epoxy resin represented by formula (1) where $R^1$ was a n-hexyl group.

Example II-8

An epoxy resin composition (AII-8) was produced in the same manner as in Example II-1, except that 378 g of 1-hexanol (1-hexanol: 0.45 mol times the amount of epichlorohydrin) instead of 183 g of 1-butanol was placed into the four-necked flask.

Table 3 presents the composition of the epoxy resin composition (AII-8) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-8) was only an epoxy resin represented by formula (1) where $R^1$ was a n-hexyl group.

Example II-9

An epoxy resin composition (AII-9) was produced in the same manner as in Example II-1, except that 504 g of 1-hexanol (1-hexanol: 0.6 mol times the amount of epichlorohydrin) instead of 183 g of 1-butanol was placed into the four-necked flask.

Table 3 presents the composition of the epoxy resin composition (AII-9) (the proportions (% by weight) of the epoxy resin (1), epoxy resin (2-0), epoxy resin (2-1), and other components), the epoxy equivalent (g/equivalent), and the hydrolyzable chlorine content (ppm by weight).

The epoxy resin (1) contained in the epoxy resin composition (AII-9) was only an epoxy resin represented by formula (1) where $R^1$ was a n-hexyl group.

Comparative Example II-1

An epoxy resin composition (AII-10) was produced in the same manner as in Example II-1, except that 1-butanol was not placed into the four-necked flask.

Table 3 presents the composition of the epoxy resin composition (AII-10) (the proportions (% by weight) of the epoxy resin (1), epoxy resin (2-0), epoxy resin (2-1), and other components), the epoxy equivalent (g/equivalent), and the hydrolyzable chlorine content (ppm by weight).

Comparative Example II-2

An epoxy resin composition (AII-11) was produced in the same manner as in Example II-1, except that 298 g of 2-propanol (2-propanol: 0.6 mol times the amount of epichlorohydrin) instead of 183 g of 1-butanol was placed into the four-necked flask.

Table 3 presents the composition of the epoxy resin composition (AII-11) (the proportions (% by weight) of the epoxy resin (1), epoxy resin (2-0), epoxy resin (2-1), and other components), the epoxy equivalent (g/equivalent), and the hydrolyzable chlorine content (ppm by weight).

[Production of Epoxy Resin Composition (B) and Evaluation of Elastic Modulus]

Examples II-10 to II-18 and Comparative Example II-3 and II-4

<Measurement of Elastic Modulus (250° C. (E'))>

The epoxy resin compositions (AII-1) to (AII-11) of Examples II-1 to II-9 and Comparative examples II-1 and II-2 were each mixed with a curing agent (phenol aralkyl resin (trade name: MEH7800SS, available from Meiwa Plastic Industries, Ltd.)) and a curing catalyst (triphenylphosphine (trade name: Hokuko TPP, available from Hokko Chemical Industry Co., Ltd.)) in the proportions given in Table 4. The resulting mixtures were heated to 100° C. and stirred until they became homogeneous, thereby providing epoxy resin compositions (BII-1) to (BII-11). The resulting epoxy resin compositions (BII-1) to (BII-11) were cured by heating at 120° C. for 2 hours and then 175° C. for 6 hours, thereby providing cured products. The resulting cured products were cut into test pieces each having a length of 5 cm, a width of 1 cm, and a thickness of 5 mm. Each of the test pieces was analyzed with a thermomechanical analyzer (DMS: EXSTAR6100, available from Seiko Instruments Inc.) in a three-point bending mode under the following measurement conditions to determine 250° C. (E') at 1 Hz as the elastic modulus.

Rate of temperature increase: 5° C./min

Measurement temperature range: 30° C. to 300° C.

TABLE 3

| Epoxy resin composition | | | Example | | | | | | | | | Comparative example | |
|---|---|---|---|---|---|---|---|---|---|---|---|---|---|
| | | | II-1 (AII-1) | II-2 (AII-2) | II-3 (AII-3) | II-4 (AII-4) | II-5 (AII-5) | II-6 (AII-6) | II-7 (AII-7) | II-8 (AII-8) | II-9 (AII-9) | II-1 (AII-10) | II-2 (AII-11) |
| Composition | Epoxy resin (1) | % by weight | 0.4 | 2.1 | 4.2 | 0.3 | 2.2 | 4.4 | 0.5 | 2.6 | 4.6 | 0 | 0 |
| | Epoxy resin (2-0) | % by weight | 88.1 | 86.4 | 83.9 | 87.3 | 85.7 | 84 | 88.3 | 85.6 | 83.9 | 81.7 | 82.8 |
| | Epoxy resin (2-1) | % by weight | 4.7 | 6.5 | 9.3 | 5.3 | 7 | 9.1 | 5 | 6.8 | 8.6 | 7.7 | 10.3 |
| | Others | % by weight | 6.8 | 5 | 2.6 | 7.1 | 5.1 | 2.5 | 6.2 | 5 | 2.9 | 10.6 | 6.9 |
| Epoxy equivalent | | g/equivalent | 183 | 188 | 193 | 186 | 188 | 191 | 185 | 187 | 191 | 193 | 193 |
| Hydrolyzable chlorine content | | ppm by weight | 220 | 260 | 320 | 250 | 290 | 350 | 270 | 320 | 370 | 720 | 400 |

Table 4 presents the results. The term "part" in Table 4 refers to "part(s) by weight".

TABLE 4

| Epoxy resin composition | | | Example | | | | | | | | | Comparative example | |
|---|---|---|---|---|---|---|---|---|---|---|---|---|---|
| | | | II-10 (BII-1) | II-11 (BII-2) | II-12 (BII-3) | II-13 (BII4) | II-14 (BII-5) | II-15 (BII-6) | II-16 (BII-7) | II-17 (BII-8) | II-18 (BII-9) | II-3 (BII-10) | II-4 (BH-11) |
| Formulation of epoxy resin composition | (AII-1) | part | 100 | | | | | | | | | | |
| | (AII-2) | part | | 100 | | | | | | | | | |
| | (AII-3) | part | | | 100 | | | | | | | | |
| | (AII-4) | part | | | | 100 | | | | | | | |
| | (AII-5) | part | | | | | 100 | | | | | | |
| | (AII-6) | part | | | | | | 100 | | | | | |
| | (AII-7) | part | | | | | | | 100 | | | | |
| | (AII-8) | part | | | | | | | | 100 | | | |
| | (AII-9) | part | | | | | | | | | 100 | | |
| | (AII-10) | part | | | | | | | | | | 100 | |
| | (AII-11) | part | | | | | | | | | | | 100 |
| | Curing agent | part | 95 | 93 | 90 | 94 | 93 | 91 | 94 | 93 | 91 | 90 | 90 |
| | Curing catalyst | part | 1 | 1 | 1 | 1 | 1 | 1 | 1 | 1 | 1 | 1 | 1 |
| Elastic modulus (250° C. (E')) | | MPa | 8 | 7 | 6 | 7 | 6 | 6 | 6 | 5 | 5 | 10 | 11 |

[Evaluation of Results]

Table 3 indicates that the epoxy resin compositions (A), each containing the epoxy resin (1), of Examples II-1 to II-9 have a lower hydrolyzable chlorine content than the epoxy resin compositions (A) of Comparative Examples II-1 and II-2 and thus have superior electrical properties.

Table 4 indicates that the epoxy resin compositions (B) of Examples II-10 to II-18 have low elastic moduli at a temperature as high as 250° C. than the epoxy resin compositions (B) of Comparative Examples II-3 and II-4 and thus have superior high-temperature crack resistance.

The present invention has been described in detail with reference to specific aspects. However, it will be understood by a person skilled in the art that various modifications can be made without departing from the spirit and scope of the invention.

The present invention contains subject matter related to Japanese Patent Application No. 2020-045532 filed on Mar. 16, 2020 and Japanese Patent Application No. 2020-045533 filed on Mar. 16, 2020, the entire contents of which are incorporated herein by reference.

The invention claimed is:

1. An epoxy resin composition (A), comprising an epoxy resin of formula (1) and an epoxy resin of formula (2):

(1)

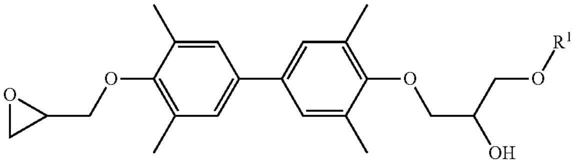

wherein $R^1$ is a linear aliphatic hydrocarbon group having from 4 to 6 carbon atoms, and (2)

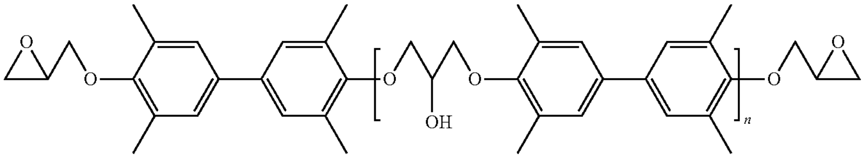

n is an integer of 0 or 1, wherein a hydrolyzable chlorine content of the epoxy resin composition (A) is 300 ppm or less by weight.

2. The epoxy resin composition (A) according to claim 1, wherein a proportion of the epoxy resin of formula (1) is from 0.01% to 5.0% by weight of the epoxy resin composition.

3. The epoxy resin composition (A) according to claim 1, wherein in the epoxy resin of formula (2), a proportion of the epoxy resin in which n=0 is from 83.0% to 90.0% by weight of the epoxy resin composition, and a proportion of the epoxy resin in which n=1 is 2.0% to 9.9% by weight of the epoxy resin composition.

4. An epoxy resin composition (B), comprising 100 parts by weight of the epoxy resin composition (A) according to claim 1 and 0.01 to 1,000 parts by weight of a curing agent.

5. The epoxy resin composition (B) according to claim 4, wherein the curing agent is at least one selected from the group consisting of phenolic curing agents, amine curing agents, acid anhydride curing agents, and amide curing agents.

6. The epoxy resin composition (B) according to claim 4, further comprising an epoxy resin different from the epoxy resin in the epoxy resin composition (A).

7. A cured product obtained by curing the epoxy resin composition (B) according to claim 4.

8. An electrical or electronic component obtained by curing the epoxy resin composition (B) according to claim 4.

* * * * *